United States Patent [19]
Dunn et al.

[11] 3,992,070
[45] Nov. 16, 1976

[54] LOCKABLE FLIP-UP INSTRUMENT PANEL

[75] Inventors: Robert C. Dunn, Lockport; Joseph M. Jania, Bolingbrook, both of Ill.

[73] Assignee: International Harvester Company, Chicago, Ill.

[22] Filed: May 15, 1975

[21] Appl. No.: 578,048

[52] U.S. Cl. .............................. 312/320; 312/22; 292/DIG. 49; 292/263
[51] Int. Cl.² .................. A47B 88/00; A47B 81/00; E05C 17/32
[58] Field of Search ................. 70/158, 159, 240; 180/82 R, 90, 114; 292/205, 263, DIG. 49; 312/21–24, 26, 27, 271, 276, 319

[56] References Cited
UNITED STATES PATENTS

| | | | |
|---|---|---|---|
| 1,544,657 | 7/1925 | Langer | 292/263 |
| 1,689,057 | 10/1928 | Schwemlein | 292/DIG. 49 |
| 2,644,737 | 7/1953 | Davis | 312/319 X |
| 2,876,857 | 3/1959 | Beyerstedt | 312/22 X |
| 2,987,355 | 6/1961 | Sandefur | 312/276 X |
| 3,302,743 | 2/1967 | Mosquera | 180/90 |
| 3,452,835 | 7/1969 | Deli et al. | 180/90 |

FOREIGN PATENTS OR APPLICATIONS

| | | | |
|---|---|---|---|
| 192,269 | 9/1906 | Germany | 292/263 |

Primary Examiner—Paul R. Gilliam
Assistant Examiner—V. Sakran
Attorney, Agent, or Firm—Douglas W. Rudy; Floyd B. Harman

[57] ABSTRACT

A console type panel having instruments integral with the cover of the panel which is capable of being positioned in either a closed and locked attitude or an opened attitude by means of an external handle connected to an over-centering operating linkage.

3 Claims, 4 Drawing Figures

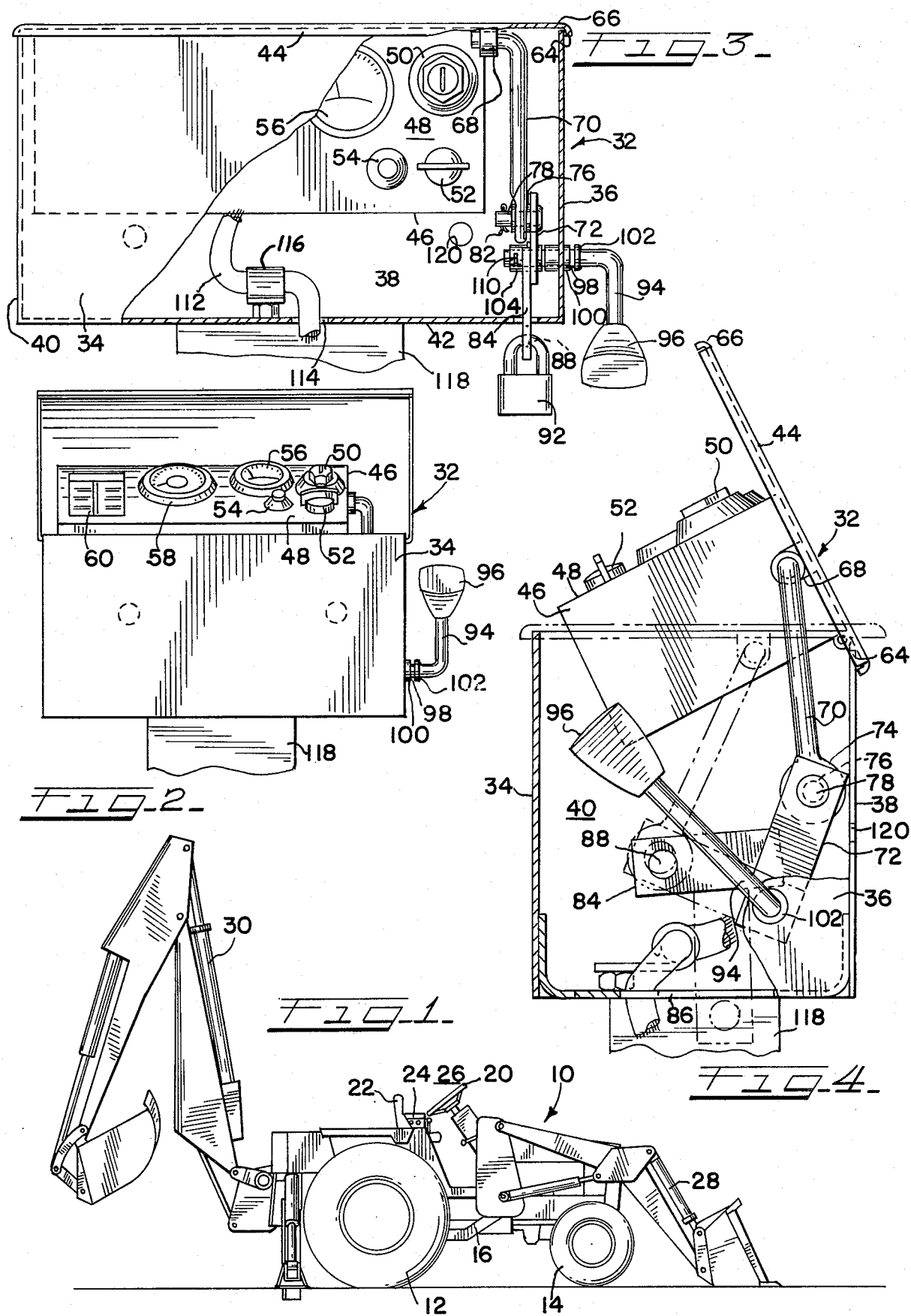

LOCKABLE FLIP-UP INSTRUMENT PANEL

BACKGROUND OF THE INVENTION

This invention relates to lockable instrument panels and more specifically to instrument panels having a lockable lid which can be pivoted to hide the instrument panel itself during periods of vehicle idleness. The type of locking instrument panel described herein lends itself to use on farm or construction type equipment such as tractors, loaders, dozers, or other earth moving apparatus which are normally exposed to malicious tampering when the vehicle is left either in the field or at a construction site.

Several types of lockable instrument panels have been developed for use on agricultural, industrial, and construction equipment. These panels generally are fixed in one position and have a cover that can swing either down to cover them or up to cover them. The cover is generally equipped such that when it is closed over the fixedly mounted instrument panel it can be locked in position.

The use of the panel cover as a functional member of the instrument panel is unique and aids in the alleviation of problems inherent in the prior art. An obvious problem with many prior art structures is that upon the uncovering of the instrument panel the operator must stow the cover away. With this invention the panel cover need not be stowed.

Another problem with prior art structures is that a place to stow the panel cover must be provided. Obviously this is not necessary in this invention.

The flip-up instrument panel as herein disclosed provides a device that requires only minimum participation on the part of the operator for its deployment while combining a vandal proof structure with excellent instrument display.

SUMMARY OF THE INVENTION

According to the present invention there is provided a lockable instrument panel for use on construction equipment. More specifically, there is provided a lockable instrument panel that provides for the secure positioning of instruments by means of the location of the instrument panel cover. The instruments, being attached to the instrument panel cover assembly, are maintained in the open position by making use of the panel weight on an over-centering linkage. Complete anti-vandalism is afforded in the closed position by a locking tab with which a padlock may be used, located on the underside of the instrument panel when the cover is closed.

One object of the invention is to provide an instrument panel that can be covered and locked securely so as to prevent damage to the instruments either from weather exposure or from vandalism. Another object of the invention is to provide a flip top instrument panel that will use the cover as an integral working component of the assembly. A feature of the invention is an integral locking tab that is located below the panel in a position protected from weather exposure and vandalism.

Still a further object of the invention is to have the weight of the cover assist in holding the flip-up instrument panel open by means of an over-centering linkage which prevents accidental closing of the instrument panel during vehicle operation.

Still other objects, features, and advantages will be either specifically pointed out or become apparent upon perusal of the following description taken in conjunction with the accompanying drawings.

BRIEF DESCRIPTION OF THE DRAWINGS

FIG. 1 is a side elevation view of a vehicle employing an embodiment of the present invention;

FIG. 2 is a front elevation view of the flip-up instrument panel engaged in an open position;

FIG. 3 is a front elevation view of the instrument panel in a closed position having the front wall partially broken away; and FIG. 4 is a side elevation view of the instrument panel in an open position having the end partially broken away exposing the linkage of the panel.

DESCRIPTION OF THE PREFERRED EMBODIMENT

Referring to FIG. 1 there is shown an industrial vehicle commonly referred to as a loader-backhoe industrial tractor which is generally indicated by 10. The vehicle is equipped with rear traction wheels 12 (only one shown) and front steerable wheels 14 (only one shown) as well as a main frame 16, steering wheel 20, a vehicle seat 22 and an instrument panel 24 generally arranged in the operator's work zone 26. A conventional bucket type loader 28 is carried in front of the tractor while a backhoe apparatus 30 is mounted to the rear of the tractor. Mounted in the forward portion of the frame 16 is an engine, not shown, which is coupled with a transmission, differential and axle drive line means which is also not shown.

FIGS. 2, 3, and 4 present detail views of the flip-up instrument panel. The following disclosure refers to these figures.

The housing, generally 32, consists of a container having a front wall 34, a handle supporting end wall 36, a back wall 38, an end wall 40, a floor panel 42, and a top lid 44.

An instrument pod 46 is permanently affixed to the inner surface of the top lid 44. The instrument pod is a box-like structure having a facia panel surface 48, being the front surface, to which a variety of dials, gauges and apparatus, such as key operated ignition switch 50, light switch 52, starting button 54, fuel gauge 56, tach-hourmeter 58, and light-up warning panel 60 are mounted. The instrument pod 46 may have, first and second side wall members, at each end thereof, a bottom or back panel and a panel between the facia panel and a bottom or back panel in order to form a fully enclosed box-like structure. The embodiment shown in the figure does not have a bottom or back panel opposite the facia panel nor does it have a panel connecting the first and second side wall members opposite the lid 44.

The lid 44 is provided with hinge means at 64 allowing pivotable movement of the lid and the attached instrument pod in respect to the housing 32. The lid 44 may be equipped with a rolled over edge 66 which projects toward the bottom of the container. This rolled over edge presents a canopy effect to umbrella the instrument panel from rain, snow, dust and other elements when the lid is closed over the container. Alternatively, the lid 44 may be a flat plate if desired.

Also permanently affixed to the inner surface of the lid 44 is an apertured tab 68 which accommodates the upper link 70 of the over centering linkage means.

The over centering linkage means has a upper link 70, as previously mentioned, as well as a lower link 72. The upper link is equipped with an apertured end 74 equipped with a bushing 76 which accepts a fulcrum pin 78 carried in an upper aperture of the lower link 72. Retainer means, for example cotter pin 82, assures containment of the fulcrum pin. The fulcrum pin position constitutes a common intermediate pivot point.

Permanently attached to the lower link 72 is a locking tab 84 which is of sufficient length and is further mounted in a prescribed relationship to the lower link such that when the lid 44 is closed over the housing 32 the locking tab 84 will project through a rectangular aperture 86 in the floor panel 42. The locking tab 84 is equipped with an aperture 88 for accommodating a closure assuring mechanism such as the padlock 92.

The linkage is actuated through the positioning of a handle 94, with a knob 96, the handle having a lower portion bent at a right angle to the upper portion and the lower portion passing through a bushing 98 welded in aperture 100 in the handle supporting end wall 36, and being retained at the appropriate penetration by a washer 102 welded to the handle.

A bushing 104 is welded into an aperture in the lower portion of the lower link 72. This bushing 104 is equipped with an aperture formed perpendicular to the major axis of the bushing for accommodating a keeper means, such as cotter pin 110, which also passes through a complementary aperture formed in the innermost end of the handle 94 perpendicular to the major axis thereof.

The pinning of the lower link 72, through bushing 104, to the handle 94 results in coupled movement between the handle and the linkage such that movement of the handle results in movement of the lid 44.

Wiring harness bundle 112 passes through an aperture 114 in the floor panel 42 and is maintained in position by means of clamp 116 to provide input data and electrical communciation between various vehicle sources and the instruments in the pod 46.

When the vehicle operator wishes to open the instrument panel he removes the padlock 92 (if so equipped) and pushes knob 96 upward. The linkage will translate the knob and handle movement to the lid 44 causing it to be flipped open. The linkage will go over center until the pivotal mid-section contacts the rear wall 38 of the housing 32. After the linkage goes over center the lid will be supporting the facia panel at an angle complementary to the vehicle operator's line of vision.

The handle weight will tend to hold the linkage over center and thereby prevent undesirable or untimely closing of the lid due to vehicle vibration or bumpy travel over rough terrain. It should be pointed out that the weight of the lid and instrument pod is greater than the weight of the handle and knob.

When the operator wishes to close the panel he simply grasps the knob 96 and pushes downward causing the pivot point of the linkage to come back over center thus allowing the lid to be pivoted down on top of the walls of the housing. The locking tab 84 is pivoted with the lower link such that the aperture 88 of the locking tab is positioned underneath the floor panel of the housing thus allowing for the installation of a locking means such as the padlock 92. The pressure that the vehicle operator exerted on the knob 96 and hence the handle 94 had to be just slightly greater than the pressure generated on the linkage through the weight of the instrument pod and the lid in order to allow the linkage to come back over center.

In the preferred embodiment the housing 32 is carried in position on the tractor on a mounting post 118 affixed to the underside of the floor panel 42. The mounting post 118 may act as a housing for the wiring harness bundle 112.

Alternatively, the housing 32 may be mounted on the vehicle through the insertion of fasteners through a plurality of apertures one shown as 120 positioned on the wall surfaces or the floor surface of the housing as necessary. This may negate the need for the mounting post.

Thus, it is apparent that there has been provided, in accordance with the invention, a flip-up instrument panel that fully satisfies the objects, aims, and advantages set forth above. Although the invention has been described in conjunction with a specific embodiment thereof, it is evident that many alternatives, modifications and variations will be apparent to those skilled in the art in light of the foregoing description. For example, the invention might be equally utilized on an articulated loader vehicle or similar piece of equipment. Accordingly, it is intended to embrace all such alternatives, modifications and variations as fall within the spirit and broad scope of the appended claims.

What is claimed is:

1. A lockable flip-up instrument panel apparatus for use on a tractor type vehicle comprising:
   a rectangular box-like housing having four walls, a floor panel having an aperture, and an open top;
   a lid having an inner and an outer surface that may be pivotally mounted on said rectangular housing;
   a pod securely affixed to the inside surface of said lid, said pod having a first and a second side wall member attached to the lid and a facia panel as the front surface of said pod for carrying instruments;
   a linking means composed of a first and a second link pivotally attached to the body at a first end and to the inner surface of the lid at the second end of the linking arm, having the first and second linking arms connected at a common intermediate pivot point;
   an operating handle secured to the lower mounting point of said linking means;
   a locking tab having an aperture affixed to said lower link of said linking means;
   a wiring harness bundle leading from the instruments housed in said facia panel of said pod through said aperture in said housing to said vehicle.

2. A lockable flip up instrument panel apparatus for use on a tractor type vehicle comprising:
   a rectangular box-like housing having four walls and a floor panel having an aperture therein;
   a lid having an inner surface that may be pivotally mounted on said rectangular box-like housing;
   a pod securely affixed to the inner surface of said lid said pod having a first and a second side wall member and a facia panel for carrying instruments attached to said lid;
   an over centering linkage means comprising an upper and a lower link linked together at a common intermediate pivot point and a linkage means being pivotally fastened to the inner surface of said lid;
   a handle fixedly attached to the lower portion of the lower link of said linkage means said handle pivotally mounted through one wall of said rectangular box-like housing whereby said over centering linkage can be urged over center and thus support said lid in an upwardly pivoted position;
a locking tab having an aperture affixed to said lower link of said over centering linkage means;
a wiring harness bundle connected to the instruments being carried by the facia panel of said pod, said wiring harness bundle passing through the aperture of said rectangular box-like housing.

3. The invention in accordance with claim 2 wherein said over centering linkage means further comprises:
an upper link having an aperture formed in one end thereof and having a second end pivotally attached to said lid;
a lower link having a fulcrum pin integral with a first end thereof for coupling with said upper link through insertion in the aperture of said upper link providing the common intermediate pivot point.

* * * * *